US011938718B2

(12) United States Patent
West

(10) Patent No.: US 11,938,718 B2
(45) Date of Patent: Mar. 26, 2024

(54) MEDIA HEIGHT NON-UNIFORMITY DETECTION

(71) Applicant: Hewlett-Packard Development Company, L.P., Spring, TX (US)

(72) Inventor: Matthew James West, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 59 days.

(21) Appl. No.: 17/416,560

(22) PCT Filed: Apr. 30, 2019

(86) PCT No.: PCT/US2019/029829
§ 371 (c)(1),
(2) Date: Jun. 21, 2021

(87) PCT Pub. No.: WO2020/222783
PCT Pub. Date: Nov. 5, 2020

(65) Prior Publication Data
US 2022/0080751 A1 Mar. 17, 2022

(51) Int. Cl.

| | |
|---|---|
| ***B41J 11/00*** | (2006.01) |
| ***B41J 11/44*** | (2006.01) |
| ***B41J 15/04*** | (2006.01) |
| ***B65H 26/02*** | (2006.01) |
| ***B65H 63/06*** | (2006.01) |
| *B41J 15/16* | (2006.01) |

(52) U.S. Cl.
CPC ............ *B41J 11/0095* (2013.01); *B41J 11/44* (2013.01); *B41J 15/04* (2013.01); *B41J 15/042* (2013.01); *B41J 15/046* (2013.01); *B65H 26/02* (2013.01); *B65H 63/06* (2013.01); *B41J 15/165* (2013.01); *B41J 2203/011* (2020.08); *B65H 2511/13* (2013.01); *B65H 2553/412* (2013.01)

(58) Field of Classification Search
CPC ........ B41J 11/0095; B41J 11/44; B41J 15/04; B41J 15/042; B41J 15/046; B41J 15/165; B41J 2203/011; B65H 26/02; B65H 63/06; B65H 2511/13; B65H 2553/412
See application file for complete search history.

(56) References Cited

U.S. PATENT DOCUMENTS 7,297,969 B1 11/2007 Wolinsky et al.
7,690,746 B2 4/2010 Mantell et al.
(Continued)

FOREIGN PATENT DOCUMENTS

CN 102431326 A 5/2012
CN 103386813 A 11/2013
(Continued)

*Primary Examiner* — Henok D Legesse

(57) ABSTRACT

In an example of the disclosure, power of a first light beam emitted across a web media along a length of the roller is measured utilizing a first optical transmitter and first optical receiver pair situated adjacent to a roller. Power of a second light beam emitted across a length of the roller is measured utilizing a second optical transmitter and second optical receiver pair situated adjacent to the roller. A media height non-uniformity is identified based upon of the measurement of the power of the first light beam and the measurement of the power of the second light beam.

15 Claims, 9 Drawing Sheets

(56) References Cited

U.S. PATENT DOCUMENTS

| | | | |
|---|---|---|---|
| 9,365,282 B2 | 6/2016 | Shingetomi et al. | |
| 9,365,382 B2 | 6/2016 | Mark et al. | |
| 9,676,202 B2 * | 6/2017 | Leighton .............. | B41J 11/0005 |
| 10,391,794 B2 * | 8/2019 | Janssen ................ | B41J 13/0009 |
| 2009/0237434 A1 | 9/2009 | Mantell et al. | |
| 2011/0063355 A1 | 3/2011 | Eun et al. | |
| 2011/0252992 A1 | 10/2011 | Viturro et al. | |
| 2012/0050373 A1 | 3/2012 | Korogi et al. | |
| 2013/0300794 A1 | 11/2013 | Leighton et al. | |
| 2016/0009516 A1 * | 1/2016 | Mark ................. | G01N 21/8901 493/320 |

FOREIGN PATENT DOCUMENTS

| | | | |
|---|---|---|---|
| CN | 204322761 | U | 5/2015 |
| CN | 105651192 | A | 6/2016 |
| DE | 4112678 | A1 | 10/1992 |
| JP | 2019-052877 | A | 4/2019 |
| WO | WO-2018065382 | | 4/2018 |

* cited by examiner

MEDIA HEIGHT NON-UNIFORMITY DETECTION

BACKGROUND

A printer may apply print agents to a paper or another media to produce an image upon the media. One example of printer is a web-fed (sometimes referred to as a "roll-fed") printer, wherein print application components apply the print agents to a web media fed to the printer by a media roll feeder system. In an example, a feeder system, sometimes referred to as unwinder, may feed a continuous web media to the printer. After application of the print agents, the printed upon media may be collected on a take-up reel or drum, or cut into sheets.

DRAWINGS

DETAILED DESCRIPTION

Figure 1:
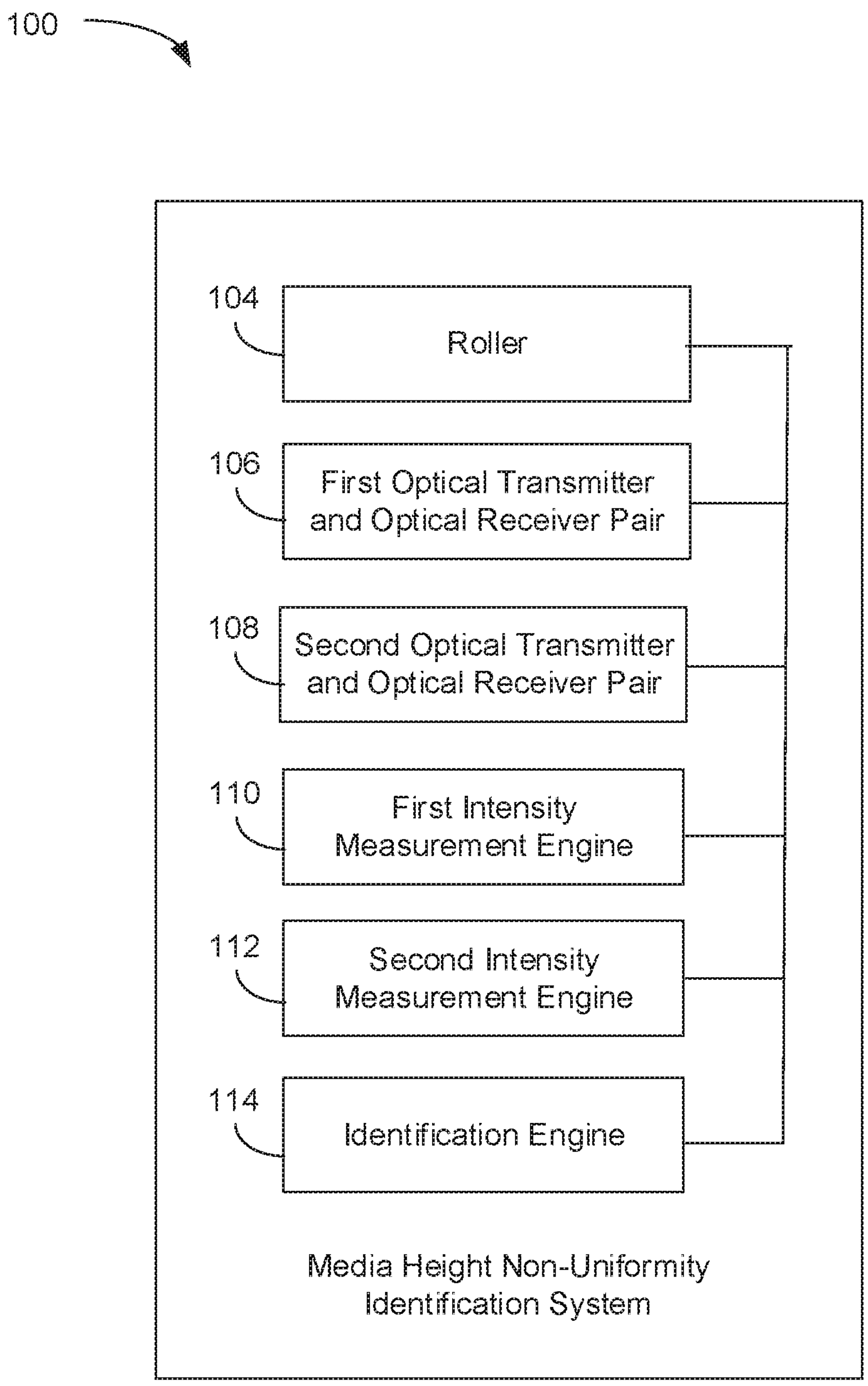
FIG. 1 is a block diagram depicting an example of a system for detecting media height nonuniformities.

In certain examples, the print application components of a web-fed printer may include arrays of inkjet printheads to eject liquid ink upon the media. In such examples, even a slight media height non-uniformity can cause physical damage to the printheads. As used herein a "media height non-uniformity" refers generally to a lack consistency in the height or thickness of a media, or a deviation from a desired or target media height. In examples, a media height non-uniformity may be a result of a wrinkle or fold in the media. In other examples, the media height non-uniformity may be a result of, or contributed to by, a manufacturing defect in the media. At a minimum, operation of the printer without addressing the web media non-uniformities, including, but not limited to wrinkles in the media, can result in significant print quality defects. In some cases, operation of the printer with web media non-uniformities can lead to printhead to media crashes. Such crashes can be highly impactful to the printer user as they may require replacement of damaged equipment and printer downtime. Media height nonuniformities that develop after the media exits the printing zone can also cause print quality issues.

Current systems for detecting media height uniformities can be unsatisfactory for large scale digital graphics printers, e.g. due to the measuring system being unable to provide operate at the necessary accuracy and/or speed. Other existing architectures, e.g. systems with numerous arrays of sensors situated along a media path, may be capable of providing the desired accuracy and speed, but are too complex and/or expensive for certain production implementation in digital graphics printers.

To address these issues, various examples described in more detail below provide a system and a method for detection of media height non-uniformity. Whereas existing media height measurement system and method typically include measuring absolute height of a web of media, the disclosed system and method utilize measuring of light intensities to detect non-uniformities in web media without a need to know an absolute height of the web media. In one example, a printer includes a print engine to form an image upon a web media during a printing operation. The printer includes a supply reel to provide the web media during the printing operation, and a take-up reel for collection of the web media after print engine forms the image upon the web media. The printer includes a set of rollers for advancing the web media, including a first roller that is to apply a wrapping tension to the web media. The printer includes a media height non-uniformity (sometimes referred to herein as a "MHN") detection system.

In an example, the MHN detection system includes a first optical transmitter positioned adjacent to an end of the roller. The first optical transmitter is to cause a first light beam to shine along a first path towards an opposite end of the roller such that the first light beam will be impacted by wrapped web media along the first path. The detection system includes a first optical receiver positioned adjacent to an opposite end of the roller. The first optical receiver is to measure strength of the first light beam.

In an example, the MHN detection system includes a second optical transmitter positioned adjacent to an end of the roller. The second optical transmitter is to cause a second light beam to shine along a second path towards an opposite end of the roller such that the second light beam will not be impacted by wrapped web media along the second path. The MHN detection system includes a second optical receiver positioned adjacent to an opposite end of the roller. The second optical receiver is to measure strength of the second light beam.

In an example, the MHN detection system includes a media height non-uniformity identification component that is to identify a media height non-uniformity based upon the measured strengths of the first and second light beams. The media height non-uniformity component is to initiate a remedial action in response to such identification. In one example, the remedial action that is implemented may be to cause a sending of a message or instruction to a user that there is a media height non-uniformity issue. In other example, the remedial action that is implemented may be to stop or pause printing operations at the printer.

In this manner, the disclosed method and system provide for effective and efficient identification of web media height uniformities at a printer. The disclosure, when integrated within a web-fed printer, can reduce or limit print quality issues and wasted supplies that can result from recurring media wrinkling and other media height non-uniformities. Users and providers of inkjet printers will also appreciate the reductions in damage to printheads and other printer components and the reductions in downtime afforded by early identification of media height nonuniformities. Installations and utilization of inkjet printers that include the disclosed method and system for detecting media height nonuniformities should thereby be enhanced.

Figure 2:
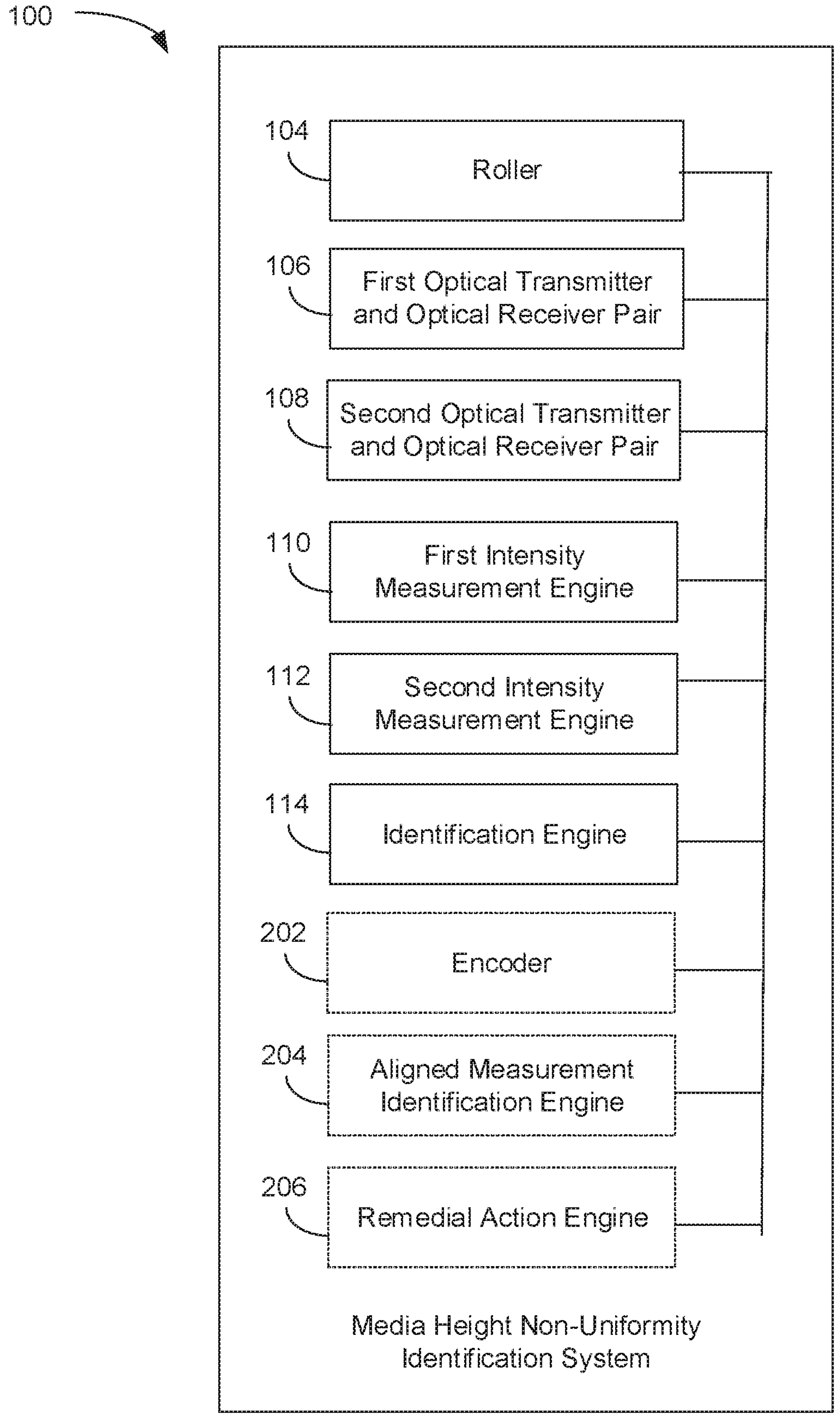
FIG. 2 is a block diagram depicting another example of a system for detecting media height nonuniformities.

FIGS. 1 and 2 depict examples of physical and logical components for implementing various examples. In FIGS. 1 and 2 various components are identified as engines 110, 112, 114, 204, and 206. In describing engines 110-114, 204 and 206 focus is on each engine's designated function. However, the term engine, as used herein, refers generally to hardware and/or programming to perform a designated function. As is illustrated with respect to FIG. 3, the hardware of each engine, for example, may include one or both of a processor and a memory, while the programming may be code stored on that memory and executable by the processor to perform the designated function.

FIG. 1 is a block diagram depicting an example of a system 100 for detection of media height non-uniformity. In this example, system 100 includes a roller 104, a first optical transmitter and optical receiver pair 106, a second optical transmitter and optical receiver pair 108, a first intensity measurement engine 110, a second intensity measurement engine 112, and an identification engine 114. As used herein, a "roller" refers generally to a cylinder that rotates around a central axis. In examples, roller 104 may be formed from a plastic, a rubber-based substance, a metal, or any other durable material formed in a cylindrical shape with a smooth surface for interfacing with a media. As used herein, "web media" refers generally to a media upon a printed image can be formed by a printer, wherein the web media is to pass through the printer as a continuous length. As used herein, a "printer" is synonymous with a "printing device" or "printing apparatus", and refers generally to any electronic device or group of electronic devices that consume a marking agent to produce a printed print job or printed content. In examples, a printer may be, but is not limited to, a liquid inkjet printer, a liquid toner-based printer, or a multifunctional device that performs a function such as scanning and/or copying in addition to printing. As used herein, a "print job" refers generally to content, e.g., an image, and/or instructions as to formatting and presentation of the content sent to a computer system for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape.

Typically, a web media is fed from a supply or feeding reel at one end of the printer, through a print zone, and after any post-print processing (e.g., drying, application of overcoats, etc.) may be wound upon a take-up reel at the opposite end of the printer. In an example, roller 114 may be one of a set of rollers included within a printer to transport web media from the feeder reel, through the printer to pass a print zone, and out of the printer to be collected upon the take-up reel. In a different example where a non-printing apparatus is situated downstream and in-line with the printer for purposes of performing a finishing operation on the web media (e.g. a cutting, folding, stapling, and/or sorting operation), the printer may not utilize a take-up reel.

System 100 includes a first optical transmitter and first optical receiver pair 106. As used herein, an optical transmitter refers to any light source that is generate a light beam. In certain examples, the light beam may be a LED beam, an infrared beam, or a laser beam. Other types of light beams are possible and contemplated by this disclosure. As used herein, an optical receiver refers to any device that is to detect the presence of the light beam emitted by the optical transmitter, and to detect changes in the intensity of the detected light beam. In examples, the optical receiver may be or include a photodetector of the following types: photodiode, phototransistor, a photon multiplier, and photoresistor.

Continuing with the example of FIG. 1, the first optical transmitter of transmitter/receiver pair 106 is positioned adjacent to an end of roller 104 and is to cause a first light beam to shine along a path towards the opposite end of roller 104. In an example, the path is a path that orthogonal to the direction of travel of the web media along roller 104. The first light beam emitted by the first optical transmitter is to encounter, as it shines along the first path, web media that is wrapped around roller 104. First optical receiver of transmitter/receiver pair 106 is to measure intensity of the first light beam. The height of the web media wrapped around roller 104 influences the strength of the light beam as it is detected by the first sensor. It follows that any non-uniformity in the height of the web media, e.g., a wrinkle, fold, ridge, crease, or other feature of the web media that causes a media height differential, will also influence the strength of the light beam as it is detected by the first sensor.

System 100 includes a second optical transmitter and second optical receiver pair 108. The second optical transmitter of transmitter/receiver pair 108 is positioned adjacent to an end of roller 104, and is to cause a second light beam to shine along a second path towards the opposite end of roller 104. In an example, the second path is a path that orthogonal to the direction of travel of the web media along roller 104.

The second light beam emitted by the second optical transmitter is to not to encounter, as it shines along the second path, web media that is wrapped around roller 104. That is, second optical transmitter is to emit the light beam in a direction such that the beam shines upon a length of roller 104 where web media will not impact the light beam. Second optical receiver of transmitter/receiver pair 108 is to measure intensity of the second light beam. An imperfection in roller 104, e.g., any bump, ridge, bulge, prominence, or other rise in the height of the roller, will influence the strength of the second light beam as it is detected by the second sensor.

Continuing with the example of FIG. 1, first intensity measurement engine 110 represents generally a combination of hardware and programming to receive data indicative of the first optical receiver's measurement of intensity of the first light beam. Second intensity measurement engine 112 represents generally a combination of hardware and programming to receive data indicative of the second optical receiver's measurement of intensity of the second light beam. Identification engine 114 represents generally a combination of hardware and programming to identify a media height non-uniformity at roller 104 in consideration of the measured intensities of the first and second light beams.

In examples, identification engine 114 identifying the media height non-uniformity may be, or include, a subtracting of a roller height non-uniformity value (as detected utilizing second optical transmitter and optical receiver pair 108) from an aggregate height non-uniformity value (as detected utilizing second optical transmitter and optical receiver pair 106) to calculate an adjusted height non-uniformity value. In a particular example, system 100 is to cause the first optical receiver's measurement of intensity of the first light beam to occur when a point X on the circumference of the roller is aligned with the first optical transmitter and first optical receiver pair 106, and is to cause the second optical receiver's measurement of intensity of the second light beam to occur when the point X on the circumference is aligned with the second optical transmitter and second optical receiver pair 108.

FIG. 2 is a block diagram depicting another example of a system for detecting media height nonuniformities. In this example system 100 includes, in addition to components 104-114 discussed with respect to FIG. 1, an encoder 202, an aligned measurement identification engine 204, and a remedial action engine 206.

In the example of FIG. 2, system 100 includes encoder 202 to track rotational position of roller 104 as roller 104 transports web media. As used herein, an "encoder" refers generally to an electromechanical device that measures position or motion, e.g., rotational position or motion of a roller in a web fed printer. In examples, encoder 202 may be an optical rotary encoder or a rotary magnetic encoder. In examples, encoder 202 may output a signal pair known as a quadrature encoder output, which consists of two channels from which location and direction of motion can be determined. In some examples, a rotary encoder may include a Z-pulse, a single pulse denoting a single location in the rotation of a roller.

Continuing at FIG. 2, aligned measurement identification engine 204 represents generally a combination of hardware and programming to, utilizing roller position data collected by encoder 202, identify a measurement of intensity of the first light beam that is to encounter the web media that occurs when a point X on the rollers circumference is aligned with the first optical transmitter and first optical receiver pair. Aligned measurement identification engine 204 is to identify a measurement of intensity of the second light beam that is not to encounter the web media that occurs when the point X is aligned with the second optical transmitter and second optical receiver pair.

In one example, first optical transmitter and first optical receiver pair 106 and second optical transmitter and second optical receiver pair 108 are continuously taking light intensity measurements. Aligned measurement identification engine 204 may utilize rotational position data collected or output from encoder 202 to identify measurements taken when point X on the circumference is aligned with the first optical transmitter and first optical receiver pair 106 or the second optical transmitter and second optical receiver pair 108. Alternatively, in a different example aligned measurement identification engine 204 might utilize rotational position data collected or output from encoder 202 to cause the first optical transmitter and first optical receiver pair 106 and the second optical transmitter and second optical receiver pair 108 to take light beam intensity measurements when aligned with point X on the circumference of roller 104.

Continuing at FIG. 2, remedial action engine 206 represents generally a combination of hardware and programming to, in response to identification engine 114 having identified a media height non-uniformity, initiate a remedial action. In one example, the remedial action is to cause issuance of a user warning, e.g. a warning that there is a media height non-uniformity or media height circumstance that could affect print quality and/or damage the device (e.g., a printer) that houses roller 104. In examples, the warning could be provided to the user visually, e.g. via a screen at a printer or a computing device connected to a printer, or via a printout. In other examples, the warning might be an audible warning. In another example, the remedial action that is initiated may be to cause a pausing or stopping of movement of the web media. In yet another example, where the media height non-uniformity detection system 100 is located within a web-fed printer, the remedial action may be a triggering of diagnostic testing for detection of damage to the printer, e.g., damage from a printhead crash, that might have resulted from the found media height non-uniformity.

In the foregoing discussion of FIGS. 1 and 2, first intensity measurement engine 110, second intensity measurement engine 112, identification engine 114, aligned measurement identification engine 204, and remedial action engine 206 were described as combinations of hardware and programming. Engines 110-114, 204, and 206 may be implemented in a number of fashions. Looking at FIG. 3 the programming may be processor executable instructions stored on a tangible memory resource 330 and the hardware may include a processing resource 340 for executing those instructions. Thus, memory resource 330 can be said to store program instructions that when executed by processing resource 340 implement system 100 of FIG. 2.

Memory resource 330 represents generally any number of memory components capable of storing instructions that can be executed by processing resource 340. Memory resource 330 is non-transitory in the sense that it does not encompass a transitory signal but instead is made up of a memory component or memory components to store the instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 100. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

Figure 3:
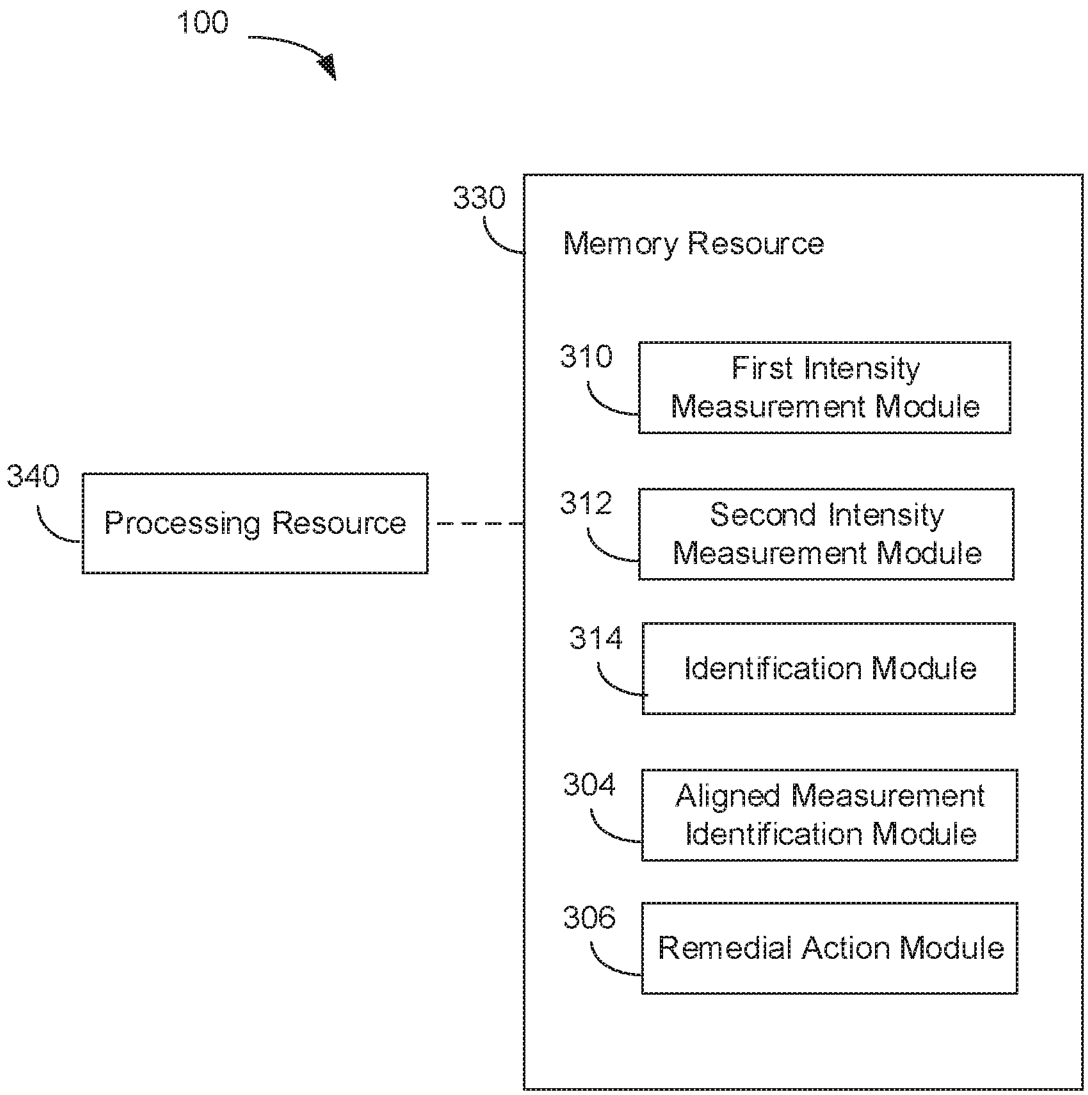
FIG. 3 is a block diagram depicting a memory resource and a processing resource to implement an example of a method for media height non-uniformity detection.

In FIG. 3, the executable program instructions stored in memory resource 330 are depicted as first intensity measurement module 310, second intensity measurement module 312, identification module 314, aligned measurement identification module 304, and remedial action module 306. First intensity measurement module 310 represents program instructions that when executed by processing resource 340 may perform any of the functionalities described above in relation to first intensity measurement engine 110 of FIG. 1. Second intensity measurement module 312 represents program instructions that when executed by processing resource 340 may perform any of the functionalities described above in relation to second intensity measurement engine 112 of FIG. 1. Identification module 314 represents program instructions that when executed by processing resource 340 may perform any of the functionalities described above in relation to identification engine 114 of FIG. 1. Aligned measurement identification module 304 represents program instructions that when executed by processing resource 340 may perform any of the functionalities described above in relation to aligned measurement identification engine 204 of FIG. 2. Remedial action module 306 represents program instructions that when executed by processing resource 340 may perform any of the functionalities described above in relation to remedial action engine 206 of FIG. 2.

FIGS. 4A-4D are simple schematic diagrams that illustrate an example of a system 100. Beginning at FIG. 4A, in this example, system 100 includes a roller 104, a first optical transmitter 106A and a first optical receiver 106B, a second optical transmitter 108A and a second optical receiver 108B, and a media height non-uniformity identification component 450 (sometimes referred to herein as "MHNIC 450." MHNIC 450 is a combination of hardware and programming for detecting media height nonuniformities that includes a first measurement engine 110, a second measurement engine 112, an identification engine 114, and remedial action engine 206, as such engines are described with respect to FIGS. 1 and 2.

Figure 4A:
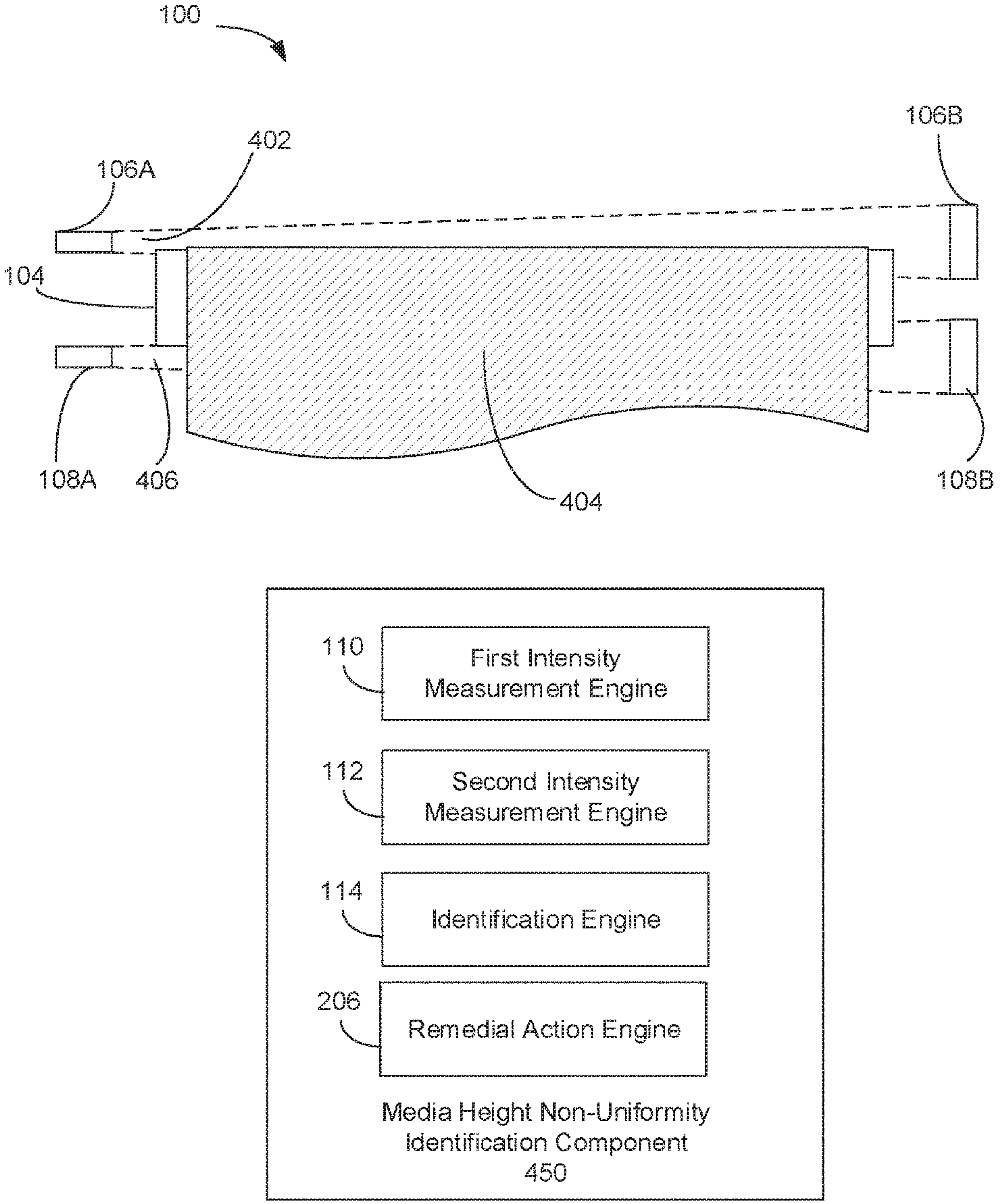
FIGS. 4A-4D are simple schematic diagrams that illustrate an example of a system for detecting media height nonuniformities.
Figure 4B:
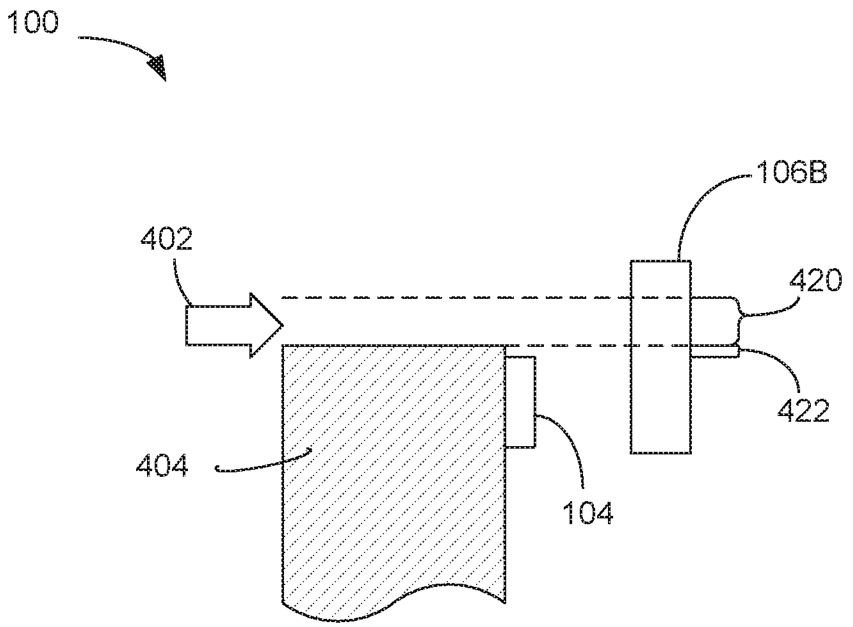

Moving to FIG. 4B in view of FIG. 4A, first optical transmitter 106A and first optical receiver 106B are situated adjacent to a roller 104 along a length of roller 104 where a media 404 is to be wrapped along roller 104. MHNIC 450 is to cause a measuring, utilizing first optical transmitter 106A and first optical receiver 106B, power of a first light beam 402 emitted across along a length of roller 104 where media 404 is wrapped along roller 104. In this example, light beam 402 encounters web media 404 such that a first portion 420 of light beam 402 is sensed by optical receiver 106B, and a second portion 422 is blocked by web media 404 and not sensed by optical receiver 106B.

Figure 4C:
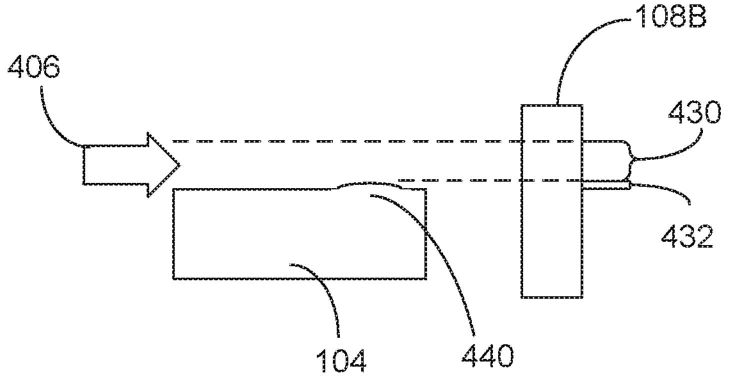

Moving to FIG. 4C in view of FIGS. 4A and 4B, second optical transmitter 108A and second optical receiver 108B are situated adjacent to roller 104. MHNIC 450 is to cause a measuring, utilizing second optical transmitter 108A and second optical receiver 108B power of a second light beam 406 emitted across a length of roller 104 where second light beam 406 will not encounter or be influenced by web media 404 (e.g., across a length of roller 104 where web media 404 is not wrapped along roller 104). In this example, light beam 406 encounters a ridge, bump or other deformity 440 in roller 104 such that a first portion 430 of light beam 406 is sensed by optical receiver 108B, and a second portion 432 is blocked by, partially blocked by, or periodically blocked by roller deformity 440 as roller 104 rotates.

Figure 4D:
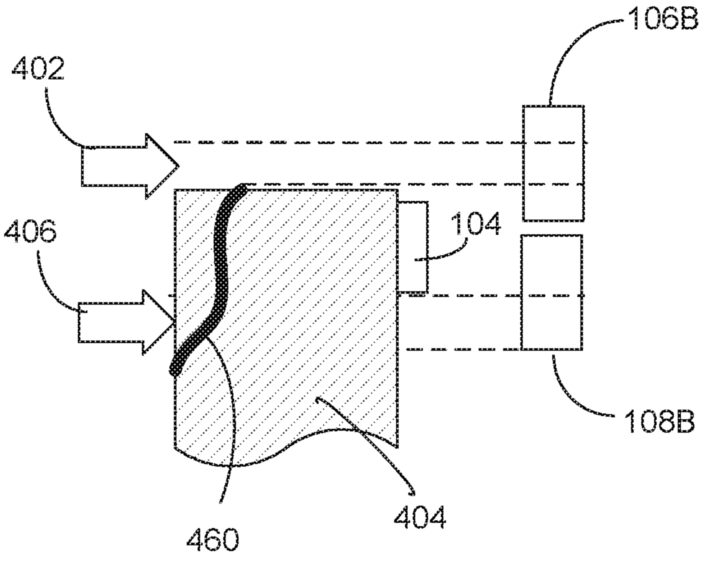

Moving to FIG. 4D in view of FIGS. 4A-4C, MHNIC 450 is to identify a wrinkle, fold, ridge, crease, or other feature of the web media or other media height non-uniformity 460 in web media 404 in based upon the measurement of the power of first light beam 402 and measurement of the power of second light beam 406. In a particular example, MHNIC 450 is to identify the media height non-uniformity 460 by comparing measurement of the power of first light beam 402 to a first target light beam power (e.g., by accessing a lookup table) to determine an aggregate height non-uniformity value. In this particular example, MHNIC 450 is also to compare the measurement of the power of second light beam 406 to a second target light beam power (e.g., by accessing a lookup table) to determine a roller height non-uniformity value.

MHNIC 450 is to in turn identify the media height non-uniformity 460 associated with media 404 in consideration of the determined aggregate height non-uniformity value and determined roller height non-uniformity value. In certain examples, MHNIC 450 may identify media height non-uniformity 460 using an adjusted height non-uniformity value, the adjusted height non-uniformity value calculated by subtracting the determined roller height non-uniformity value from the determined aggregate height non-uniformity value. In examples, MHNIC 450 may identify media height non-uniformity and/or a media height uniformity attribute (e.g., a type of non-uniformity, a location of the non-uniformity upon web media 104, or a degree of non-uniformity) by comparing the adjusted height non-uniformity value to a lookup table that associates adjusted height non-uniformity value with media height non-uniformities.

Returning to FIG. 4A in view of FIGS. 4B-4C, in response to having identified a media height non-uniformity 460 associated with web media 404, MHNIC 450 is to initiate a remedial action. In one example, the initiated remedial action is to provide a warning to a user that the web has a media height non-uniformity. In another example, for instance where the identified media height non-uniformity is deemed severe enough to damage the printer, the initiated remedial action may be to stop or pause movement of the web media. In a particular example wherein roller 104 is included within a printer, the remedial action of pausing or stopping movement of the web media may include pausing of a print agent application operation at the printer (e.g., for inkjet printing, pausing firing of printheads that eject liquid ink, or for laser or LEP printing, pausing transfer of dry toner or electrostatic ink, respectively, to a media).

Figure 5A:
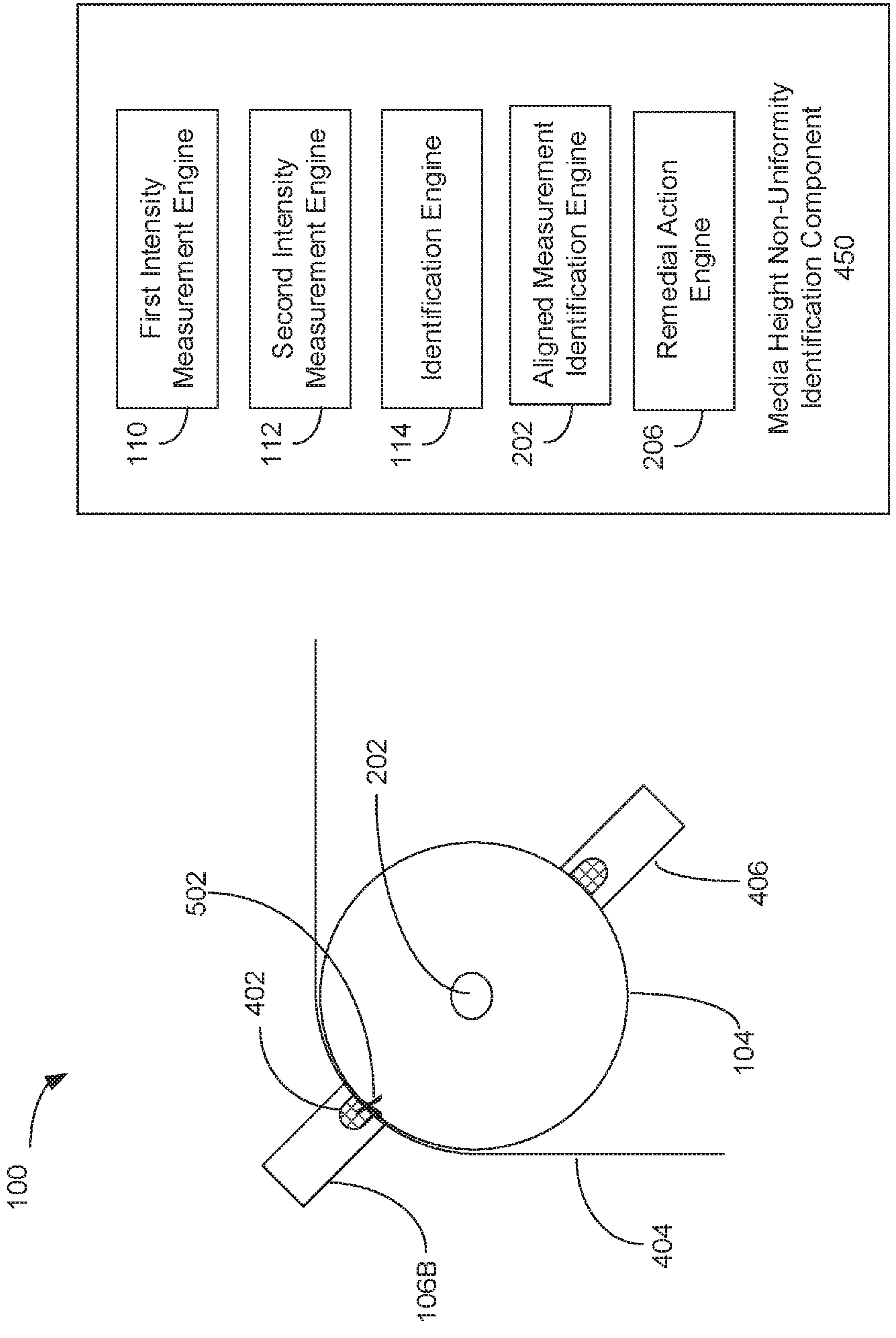
FIGS. 5A and 5B are schematic diagrams showing cross-section views of an example of a system for detecting media height nonuniformities.
Figure 5B:
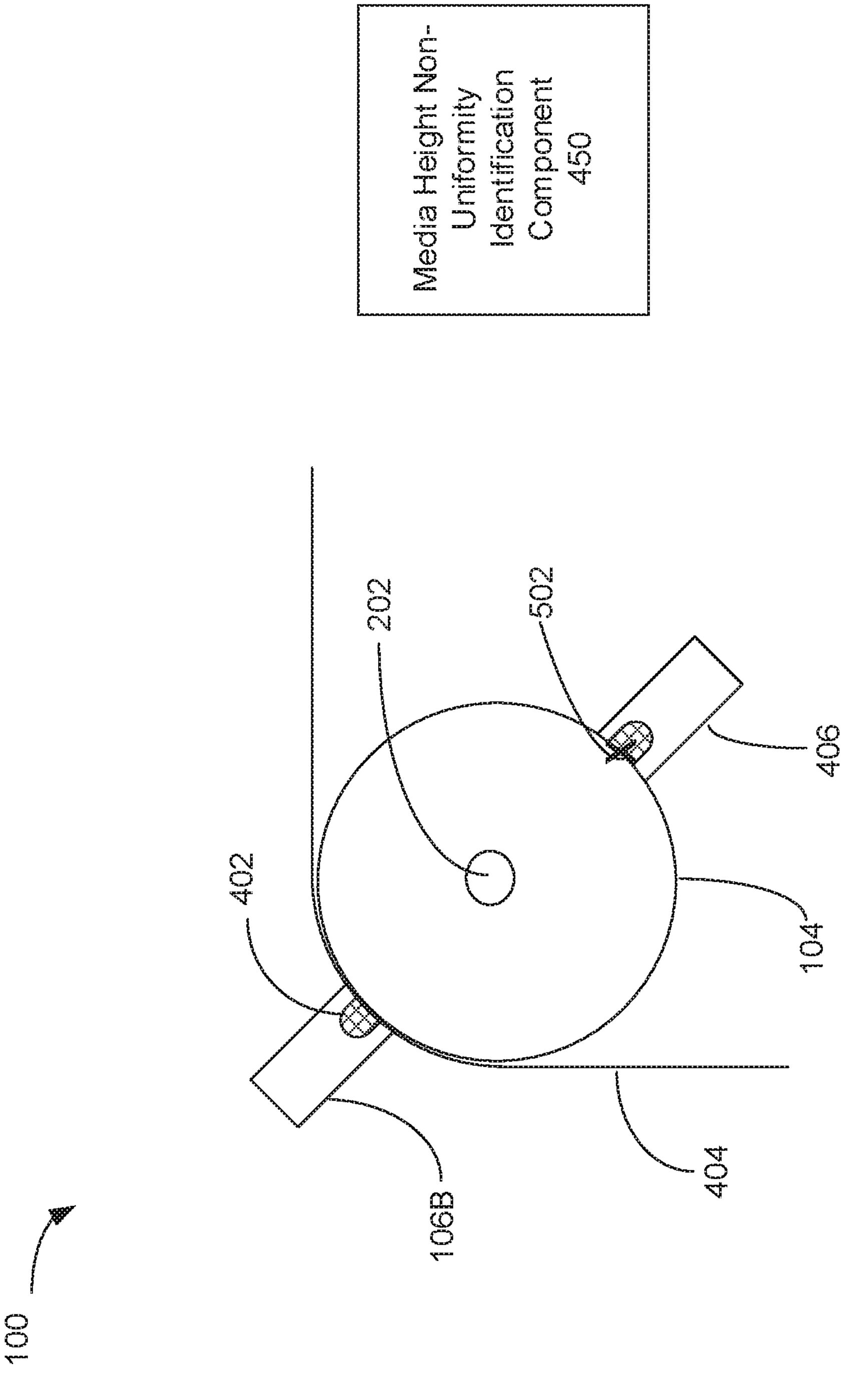

FIGS. 5A and 5B are schematic diagrams showing cross-section views of an example of a system for detecting media height nonuniformities. In this example, system 100 includes a roller 104, an encoder 202, a first optical transmitter (not illustrated in FIGS. 5A and 5B), a first optical receiver 106B, a second optical transmitter (not illustrated in FIGS. 5A and 5B), a second optical receiver 108B, and MHNIC 450. MHNIC 450 is a combination of hardware and programming for detecting media height nonuniformities that includes a first measurement engine 110, a second measurement engine 112, an identification engine 114, an aligned measurement identification engine 202, and a remedial action engine 206, as such engines are described with respect to FIGS. 1 and 2.

Roller 104 is to apply a wrapping tension to a web media 404. A first optical transmitter that is adjacent to an end of roller 104 is to cause a first light beam 402 to shine along a first path towards an opposite end of roller 104. First light beam 402 is to encounter the wrapped web media 404 along the first path, and first optical receiver 106B is to measure intensity of first light beam 402.

Continuing with the example of FIGS. 5A and 5B, A second optical transmitter is adjacent to an end of roller 104. The second optical transmitter is to cause a second light beam 406 to shine along a second path towards an opposite end of roller 104. The second optical transmitter and second optical receiver 108B are positioned such that second light beam 406 will not encounter, be diverted by, or otherwise affected by wrapped web media along the second path. Second optical receiver 108B is to measure intensity of second light beam 406.

Encoder 202 is a combination of hardware and programming for tracking rotational position of roller 104 as the roller transports or moves web media 404. In some examples roller 104 may be a roller with an attached motor so as to actively move web media 404. In other examples, roller 104 may be a passive roller.

Continuing with the example of FIGS. 5A and 5B, MHNIC 450 is to utilize readings from encoder 202 to identify a first measurement and a second measurement from a plurality of measurements from among a plurality of light beam power measurements made by the first and second optical transmitter and optical receiver pairs. Looking at FIG. A, MHNIC 450 is to, utilizing roller position data that is collected by encoder 202, identify the first measurement that is a measurement of intensity of first light beam 402 that occurs when a point X 502 upon the circumference of roller 104 is aligned with first optical transmitter and first optical receiver 106B pair. Looking at FIG. 5B, MHNIC 450 is to, utilizing roller position data that is collected by encoder 202, identify the second measurement that is a measurement of intensity of second light beam 406 that occurs at a stage in roller 104's rotation when the point X 502 is aligned with the second optical transmitter and second optical receiver 108B pair.

MHNIC 450 is to receive data indicative of the first measurement of intensity of first light beam 402 and the second measurement of intensity of second light beam 404, and identify a media height non-uniformity at media 404 based upon the measured intensities. Upon identifying the media height non-uniformity, MHNIC 450 is to trigger a remedial action such as issuing a user warning or stopping print agent application operations at the printer.

Figure 6A:
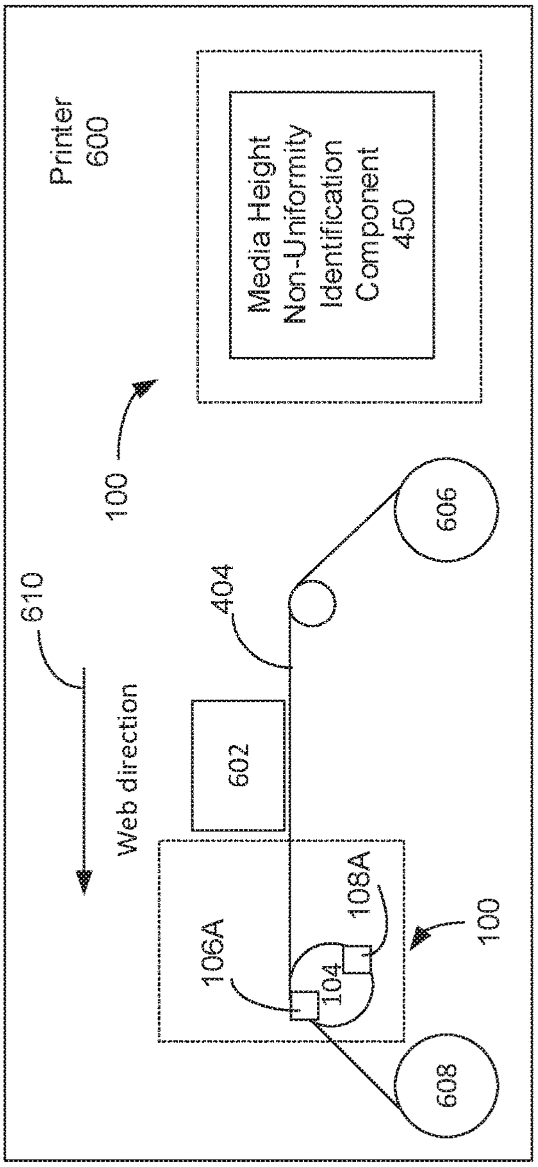
FIGS. 6A and 6B are simple schematic diagrams that illustrate examples of printers that include a system for detecting media height nonuniformities.
Figure 6B:
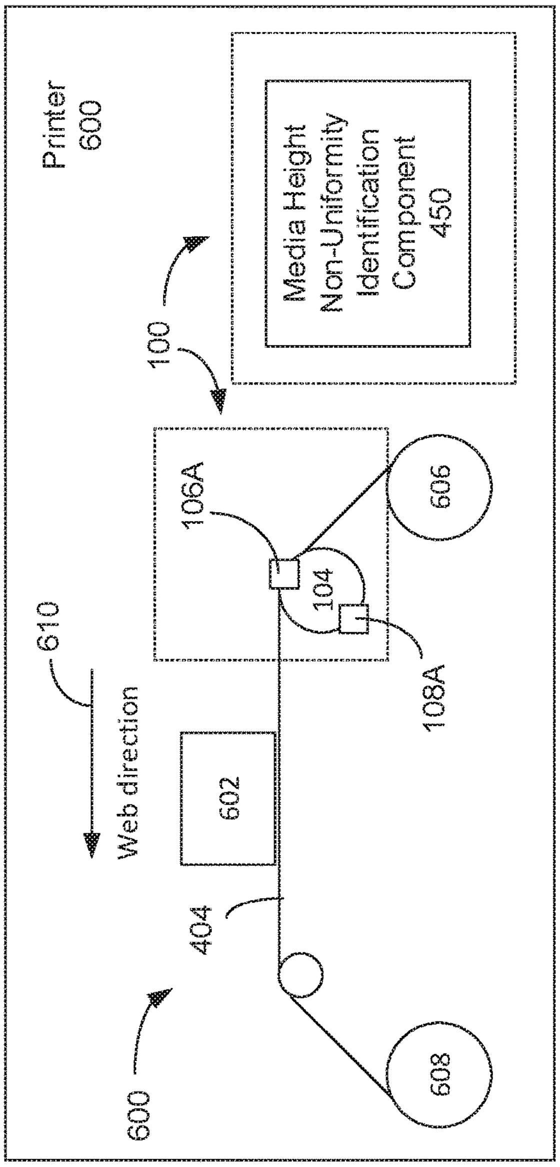

FIGS. 6A and 6B are simple cross section schematic diagrams that illustrate an example of a printer 600. In each of FIGS. 6A and 6B, printer 600 includes a print engine 602 to form an image upon a web media 404 during a printing operation. As used herein, "print engine" refers generally to a set of components that are utilized to apply a print agent to a media, e.g., a web media. In a particular example, print engine 602 may be an inkjet print engine that includes a print bar with a set or sets of thermal inkjet printheads. In another example, print engine 602 may be a piezo print engine 602 that includes a print bar, or another set or sets, of piezo printheads. In another example, print engine 602 may be a dry toner laser printing engine, and the print agent application components may include a photoconductor, a dry toner cartridge, and/or a fuser element. In yet another example, print engine 602 may be a liquid electro-photographic ("LEP") printer, with print application components including a writing element, a photoconductor element, a charge element, an intermediate transfer member or blanket, and/or an impression drum. In other examples, the applying of the print agent to the web media length may include utilizing a primer coater apparatus to apply a primer coat layer to the web media length. In other examples, the applying of the print agent to the web media length may include utilizing an overprint coater apparatus to apply an overprint coat layer to the web media length.

In each of FIGS. 6A and 6B, printer 600 includes a supply reel 606 to provide web media 404 in a web direction 610 during the printing operation, and a take-up reel 608 for collection of web media 404 after the image is formed upon web media 404 by print engine 602. Printer includes a set of rollers, including roller 104, to a roller to apply a wrapping tension to web media 404.

In each of FIGS. 6A and 6B, printer 600 includes a web media height non-uniformity detection system 100. System 100 includes a first optical transmitter 106A positioned adjacent to an end of roller 104. The first optical transmitter 106A is to cause a first light beam to shine along a first path towards an opposite end of roller 104 such that the first light beam will be impacted by wrapped web media along the first path. A first optical receiver (not visible in the cross-section views of FIGS. 6A and 6B) positioned adjacent to the opposite end of roller 104 is to measure strength of the first light beam generated by first optical transmitter 106A.

In each of FIGS. 6A and 6B, system 100 includes a second optical transmitter 108A positioned adjacent to an end of the roller, to cause a second light beam to shine along a second path towards an opposite end of roller 104 such that the second light beam will not be impacted by wrapped web media along the second path. A second optical receiver (not visible in the cross-section views of FIGS. 6A and 6B) positioned adjacent to the opposite end of roller 104 is to measure strength of the second light beam.

In each of FIGS. 6A and 6B, system includes a media height non-uniformity identification component ("MHNIC 450"). In these examples MHNIC 450 is a combination of hardware and programming for detecting media height non-uniformities that includes an identification engine 114 and remedial action engine 206, as such engines are described with respect to FIGS. 1 and 2. In these examples MHNIC 450 is to identify a media height non-uniformity on web media 404 based upon the measured strengths of the first and second light beams. Upon identifying the media height non-uniformity, MHNIC 450 is to initiate a remedial action in response to such identification.

The printers of the examples of FIGS. 6A and 6B differ in the location of print engine 602 relative to certain components of web media height non-uniformity detection system 100. In FIG. 6A roller 104, the first optical transmitter and optical receiver pair (first optical transmitter 106A and the first optical receiver that is not visible in FIGS. 6A and 6B) and the second optical transmitter and optical receiver pair (second optical transmitter 108A and the second optical receiver that is not visible in FIGS. 6A and 6B) are positioned downstream from print engine 602 with respect to the direction of web media movement 610 during a printing operation. In this manner the non-uniformity detection system 100 can detect wrinkles and other media non-uniformities that develop post-application of print agent by the print engine.

In FIG. 6B roller 104, the first optical transmitter and optical receiver pair, and the second optical transmitter and optical receiver pair are positioned upstream to print engine 602 with respect to the direction of web media movement 610 during a printing operation. In a particular example, print engine 602 includes a set of printheads and these components of system 100 are positioned upstream from the printheads. In this manner the non-uniformity detection system 100 can detect wrinkles and other media non-uniformities that develop prior to web media 404 encountering printheads at print engine 602, and may thereby avoid a web media to printhead crash that could may have substantial cost in terms of lost time and/or damage to the printheads.

Figure 7:
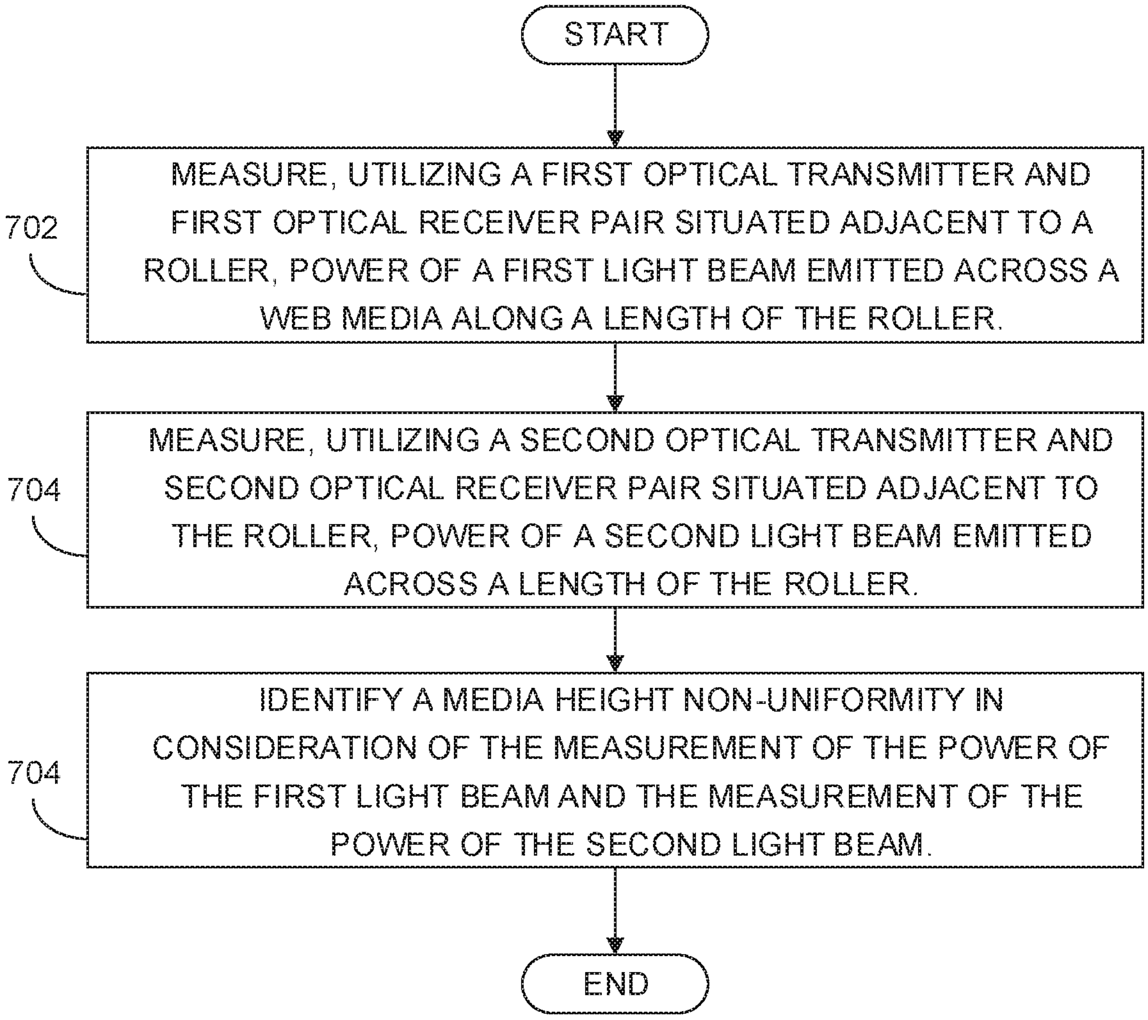
FIG. 7 is a flow diagram depicting an example implementation of a method for detecting media height nonuniformities.

FIG. 7 is a flow diagram of implementation of a method for is a flow diagram depicting an example implementation of a method for detecting media height nonuniformities. A power of a first light beam emitted across a web media along a length of a roller is measured. The measurement is made utilizing a first optical transmitter and first optical receiver pair situated adjacent to the roller (block 702).

Power of a second light beam emitted across a length of the roller is measured. The measurement is made utilizing a second optical transmitter and second optical receiver pair situated adjacent to the roller (block 704).

A media height non-uniformity is identified in consideration of the measurement of the power of the first light beam and the measurement of the power of the second light beam (block 704).

FIGS. 1-7 aid in depicting the architecture, functionality, and operation of various examples. In particular, FIGS. 1-6 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIG. 7 shows specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A method for detecting a web media height non-uniformity at a roller, comprising:

measuring, utilizing a first optical transmitter and first optical receiver pair situated adjacent to a roller, power of a first light beam emitted across a web media along a length of the roller;

measuring, utilizing a second optical transmitter and second optical receiver pair situated adjacent to the roller, power of a second light beam emitted across a length of the roller; and identifying a media height non-uniformity based upon the measurement of the power of the first light beam received by the first optical receiver of the first optical transmitter and first optical receiver pair compared to the measurement of the power of the second light beam received by the second optical receiver of the second optical transmitter and second optical receiver pair.

2. The method of claim 1, wherein the first light beam is emitted across the web media along a length of the roller where the web media is wrapped along the roller, and wherein the second light beam is emitted across a length of the roller where the web media is not wrapped along the roller.

3. The method of claim 1, wherein the measurement of power of the first light beam emitted across the web media (the "first measurement") occurs when a point X on the circumference of the roller is aligned with the first optical transmitter and first optical receiver pair; and wherein the measurement of power of the second light beam emitted across the length of the roller (the "second measurement") occurs when the point X is aligned with the second optical transmitter and second optical receiver pair.

4. The method of claim 3, further comprising utilizing an encoder to track rotational position of the roller as the roller moves the web media, and utilizing readings from the encoder to identify the first measurement and the second measurement from a plurality of measurements from among a plurality of light beam power measurements made by the first and second optical transmitter and optical receiver pairs.

5. The method of claim 1, wherein identifying the media height non-uniformity includes comparing the measurement of the power of the first light beam to a first target light beam power to determine an aggregate height non-uniformity value;

comparing the measurement of the power of the second light beam to a second target light beam power to determine a roller height non-uniformity value; and identifying the media height non-uniformity in consideration of the aggregate height non-uniformity value and the roller height non-uniformity value.

6. The method of claim 1, wherein identifying the media height non-uniformity includes subtracting the roller height non-uniformity value from the aggregate height non-uniformity value to calculate an adjusted height non-uniformity value.

7. The method of claim 1, further comprising, responsive to identifying the media height non-uniformity, initiating a remedial action.

8. The method of claim 7, wherein the remedial action includes at least one from the set of warning a user and pausing movement of the web media.

9. The method of claim 8, wherein the roller is included within a printer, and pausing movement of the web media includes a pausing of print agent application operation at the printer.

10. A system for detecting a web media height non-uniformity, comprising:

a roller to apply a wrapping tension to a web media;

a first optical transmitter and first optical receiver pair, wherein the first optical transmitter is adjacent to an end of the roller and is to cause a first light beam to shine along a first path towards an opposite end of the roller, the first light beam to encounter wrapped media along the first path, wherein the first optical receiver is to measure intensity of the first light beam;

a second optical transmitter and first optical receiver pair, wherein the second optical transmitter is adjacent to an end of the roller and is to cause a second light beam to shine along a second path towards an opposite end of the roller, wherein the second optical transmitter and the second optical receiver pair is positioned such that the second light beam will not encounter wrapped media along the second path, wherein the second optical receiver is to measure intensity of the second light beam;

a first intensity measurement engine, to receive data indicative of a measurement of intensity of the first light beam:

a second intensity measurement engine, to receive data indicative of a measurement of intensity of the second light beam; and an identification engine, to identify a media height non-uniformity based upon the measured intensities of the first and second light beams.

11. The system of claim 10, further comprising a remedial action engine to, responsive to identification of the media height non-uniformity, initiate a remedial action that includes at least one from the set of issuing a user warning and stopping movement of the web media.

12. The system of claim 10, wherein the roller is included within a printer, and wherein the remedial action includes causing performance of diagnostic testing for detection of printhead crash damage.

13. The system of claim 10, wherein the roller, the first optical transmitter and optical receiver pair, and the second optical transmitter and optical receiver pair are positioned downstream from printheads with respect to direction of web media movement during a printing operation.

14. The system of claim 10, further comprising an encoder for tracking rotational position of the roller as the roller transports the web media; and an aligned measurement identification engine to, utilizing roller position data collected by the encoder, identify a measurement of intensity of the first light beam that occurs when a point X on the roller's circumference is aligned with the first optical transmitter and first optical receiver pair, and to identify a measurement of intensity of the second light beam that occurs when the point X is aligned with the second optical transmitter and second optical receiver pair.

15. A printer, comprising:

a print engine to form an image upon a web media during a printing operation;

a supply reel to provide the web media during the printing operation;

a take-up reel for collection of the web media after the image is formed upon the web media;

a roller to apply a wrapping tension to the web media;

a web media height non-uniformity detection system, including a first optical transmitter positioned adjacent to an end of the roller, to cause a first light beam to shine along a first path towards an opposite end of the roller such that the first light beam will be impacted by wrapped media along the first path, a first optical receiver positioned adjacent to an opposite end of the roller to measure strength of the first light beam, a second optical transmitter positioned adjacent to an end of the roller, to cause a second light beam to shine along a second path towards an opposite end of the roller such that the second light beam will not be impacted by wrapped media along the second path, a second optical receiver positioned adjacent to an opposite end of the roller to measure strength of the second light beam, and a media height non-uniformity identification component to identify a media height non-uniformity based upon the measured strengths of the first and second light beams, and to initiate a remedial action in response to such identification.

* * * * *